United States Patent [19]

Nicholson

[11] 4,351,795

[45] Sep. 28, 1982

[54] GRIDS FOR NUCLEAR FUEL ASSEMBLIES

[75] Inventor: Graham Nicholson, Kirkham, England

[73] Assignee: British Nuclear Fuels Limited, Warrington, England

[21] Appl. No.: 192,614

[22] Filed: Sep. 30, 1980

[30] Foreign Application Priority Data

Oct. 17, 1979 [GB] United Kingdom ................. 7936031

[51] Int. Cl.³ .............................................. G21C 3/34
[52] U.S. Cl. .................................... 376/442; 376/441; 376/438
[58] Field of Search ........................ 376/438, 441, 442

[56] References Cited

U.S. PATENT DOCUMENTS 3,350,275 10/1967 Venier ................................. 376/442
4,125,435 11/1978 Sabsen ................................ 376/442

Primary Examiner—Donald P. Walsh
Attorney, Agent, or Firm—William R. Hinds

[57] ABSTRACT

A spacer grid for fuel assemblies in a water reactor is provided. The grid shell is shaped so that a pressing in Zircaloy can be made. Cross members in a lattice in the shell provide spacing for the fuel pins of the fuel assembly. Each fuel pin has its own cell in the lattice, and at least some of the joints between the members comprise two attachment points spaced along one of the members at a single intersection.

15 Claims, 8 Drawing Figures

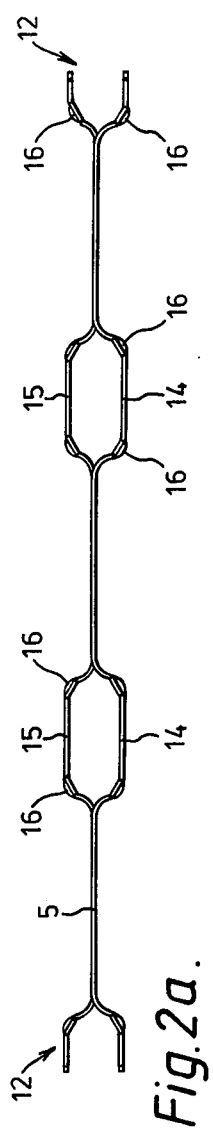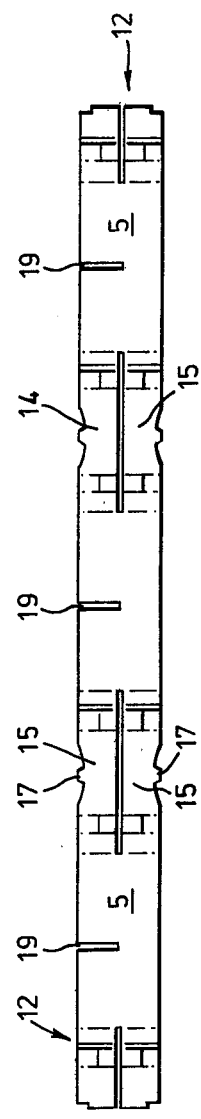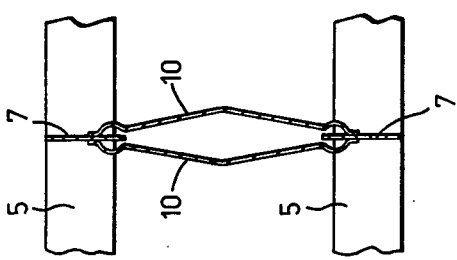

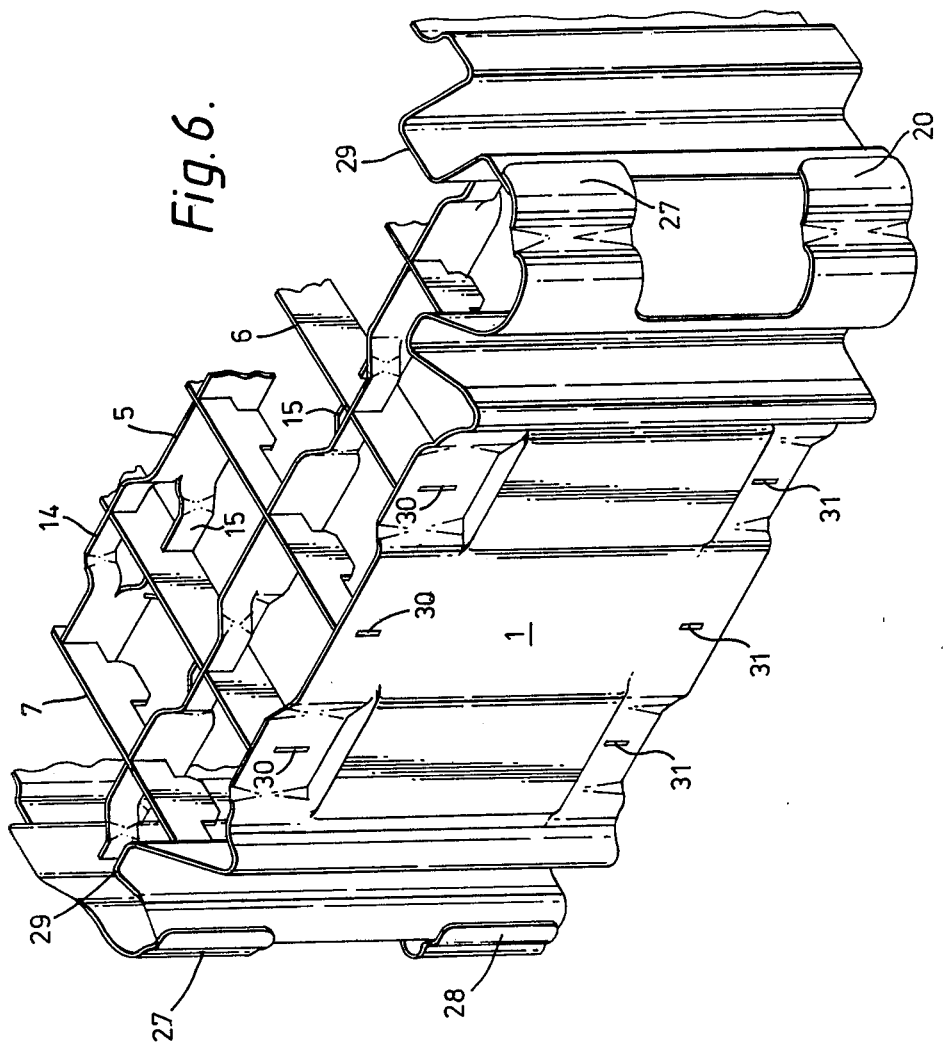

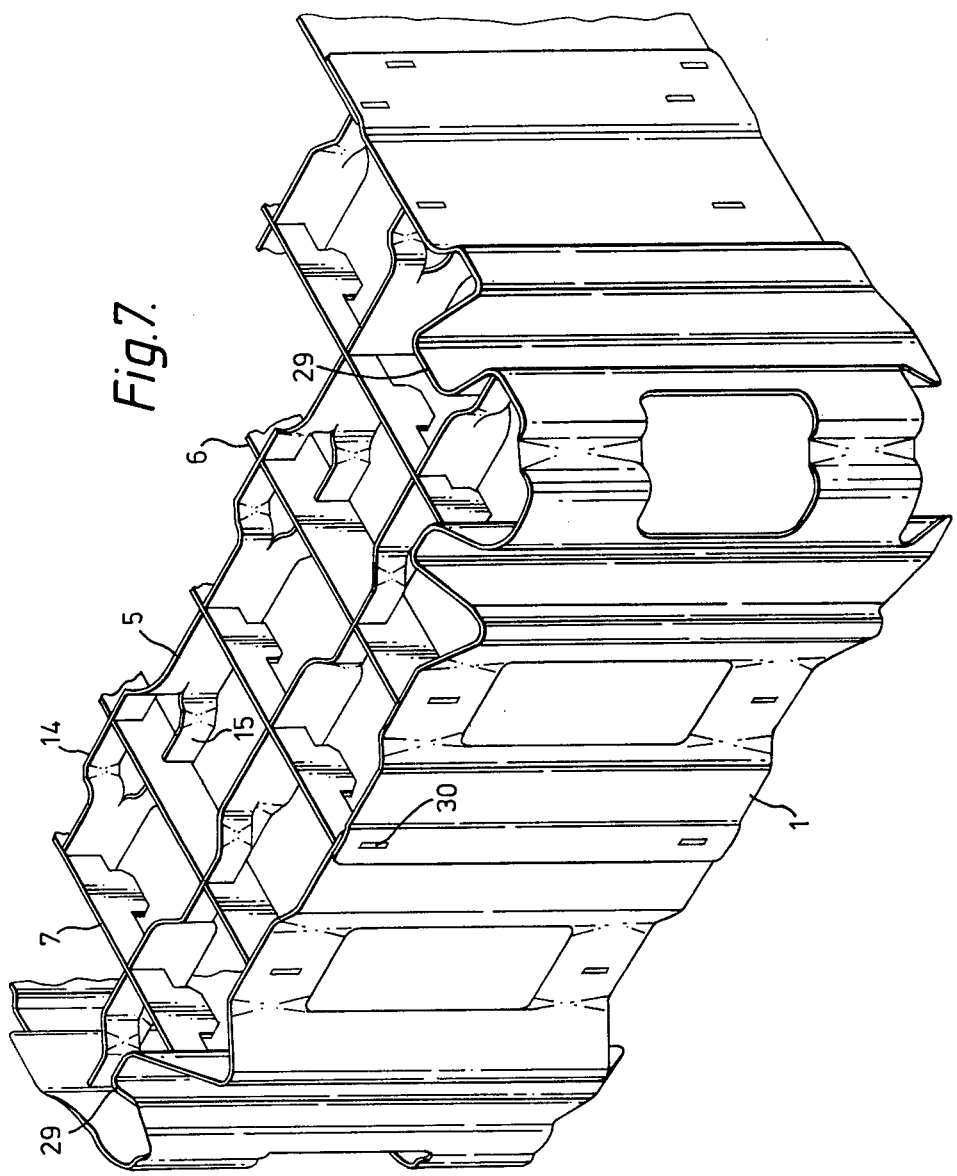

GRIDS FOR NUCLEAR FUEL ASSEMBLIES

BACKGROUND OF THE INVENTION

This invention relates to grids for nuclear fuel assemblies. A fuel assembly comprises a plurality of elongate fuel pins supported in a bundle with their longitudinal axes parallel. One or more grids may be employed intermediate the upper and lower ends of such a fuel assembly for retaining a correct location of the fuel pins in the assembly relative to one another. One example of grid for a nuclear fuel assembly is described in British Patent Specification Ser. No. 1,186,518.

An object of the present invention is to provide an improved grid tending to have greater strength and tending to offer better location of the fuel pins.

SUMMARY OF THE INVENTION

According to the present invention, a grid for a nuclear fuel assembly comprises sets of generally parallel strips arranged to intersect to define a structure of cellular form, at least some of the intersections including a strip which is keyed to another strip at more than one point.

One type of strip is dimpled along its length and another type of strip may have slots for keying with the dimples.

Preferably, said one type of strip is split in a direction parallel to its longitudinal axis at points along its length so that oppositely directed dimples can be provided at these points.

Advantageously, dimples in said one type of strip extend towards dimples of adjacent strips in the structure, the dimples being at the same level.

Conveniently, the structure is bounded by a peripheral band and the band includes channelled tabs for engagement by a fuel assembly shroud.

Advantageously, the peripheral band comprises four similar parts arranged in a rectangle. The similar parts may be generally 'L' shaped. The arms of the 'L' may be of equal length.

DESCRIPTION OF THE DRAWINGS

Two embodiments of the present invention will now be described, by way of example only, with reference to the accompanying drawings in which:

FIG. 2a is a plan view of a type of strip used in FIG. 1,

FIG. 2b is a side view of FIG. 2a,

FIG. 5 is a sectional view looking along V—V of FIG. 1,

FIG. 6 is a perspective view of part of FIG. 1, and

FIG. 7 is a similar view to FIG. 6 but of a different embodiment.

DESCRIPTION OF THE PREFERRED EMBODIMENTS

Figure 1:
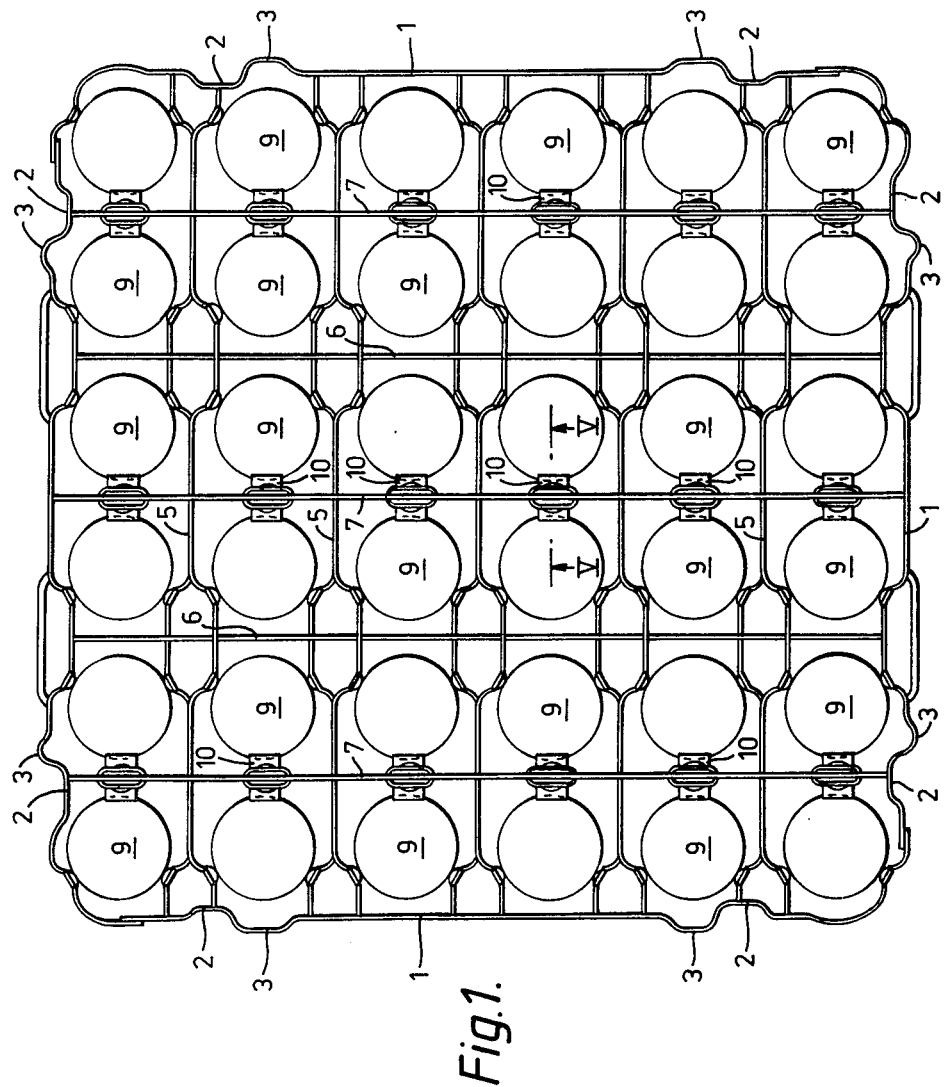
FIG. 1 is a plan view of a spacer grid for a nuclear fuel assembly.

Reference is made firstly to FIG. 1, which shows a generally square spacer grid comprising a peripheral band including four similar wall members 1. Each wall member is 'L' shaped and the long arm of one member is welded to the shorter arm of the next member. Towards the ends of the longer arm of the 'L' shaped members, there are provided channel sections 2, the purpose of which is explained below. Outward protrusions 3 are provided on each member adjacent to the channel section 2, and these protrusions form contact pads to the fuel assembly (not shown). The wall members 1 are edge on to coolant flow and are fabricated from zirconium alloy suitable for use in water reactors and known as Zircaloy. Zircaloy lacks ductility so that the simple configuration of the 'L' shaped members 1 is useful in fabrication.

A plurality of generally parallel spacer strips are supported by the members 1, which strips are of three types indicated by 5, 6 and 7 respectively. The three types which are also made of zircaloy are more fully described below, but it can be seen from FIG. 1 that types 6 and 7 are generally orthogonal to type 5. The spacer strips define a cellular grid and fuel pins pass perpendicularly through this grid. Fuel pins are indicated schematically by 9. The fuel pins 9 are retained in spaced apart relationship by the spacer strips. The fuel pins rest against springs 10 which are described below, and the spacer strips 5.

Reference is now made to FIG. 2, which shows one of the type of strips indicated by 5 in FIG. 1. The strips are disposed edge on to coolant flow and are dimpled, ie split and opened centrally longitudinally at their ends and at two intermediate positions so as to provide forks 12 at the ends and upper and lower loops 14, 15 respectively at the intermediate position. The forks 12 and loops 14, 15 project outwardly from the sides of the strips 5. The loops 14, 15 have a generally flat portion away from the axis of the strip and curved portions 16 joining the flat portion to the strip. The curved portions 16 contain an outward bulge as can be seen in enlarged section associated with FIG. 2(a). The curved portions 16 contact the fuel pins 9 in use (see FIG. 1). The flat portion contains raised parts 17 which are used for attachment to other strips as will be explained below. Slots 19 are provided in the strip between the looped parts thereof, the slots 19 being for engagement with the strips 7. As can be seen from FIG. 1, loops 14 project toward loops 14 of the adjacent strip 5 and loops 15 towards loops 15 of the adjacent strip.

Figure 3:
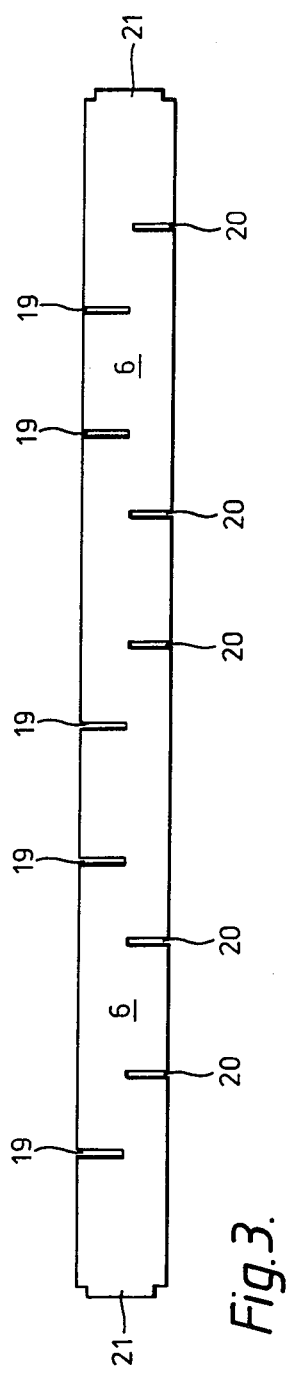
FIG. 3 is a similar view to FIG. 2b but of another type of strip.

Reference is made now to FIG. 3, which shows an example of the type of strip indicated by 6 in FIG. 1. The strip contains a series of slots 19 along one edge and a similar series 20 along the other edge. The slots 19 and 20 are provided for engagement with the loops 14, 15 of the strips 5. One of an adjacent pair of slots 19 and one of slots 20 engages with a loop 14 and the other with a loop 15. Tabs 21 are provided at the ends of the strip 6 for attachment to wall member 1.

Figure 4:
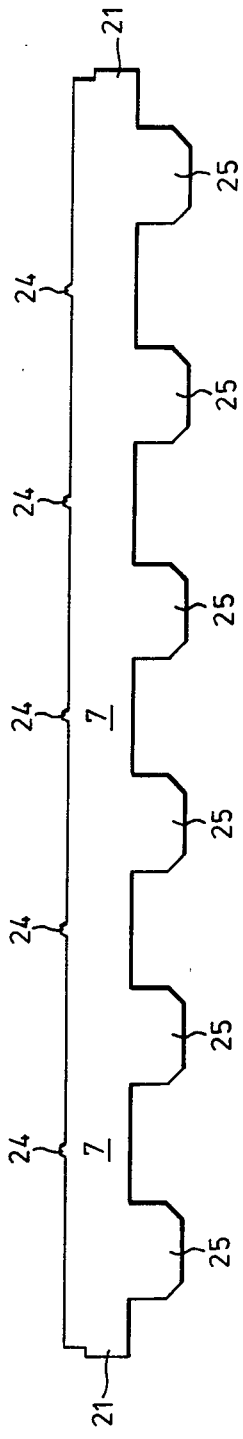
FIG. 4 is a similar view to FIGS. 2b and 3 but of a third type of strip.

Reference is made now to FIG. 4, which shows an example of the type of strip indicated by 7 in FIG. 1. The strip 7 has raised portions 24 periodically along its length for engagement within the slots 19 of the strips 5. The strips 7 are provided with tabs 21 at their end. The strips 7 have castellations 25 which are used to support the springs 10 as will be explained with reference to FIG. 5 to which reference is now made.

In FIG. 5, the springs 10 can be more clearly seen. The springs 10 are made for example of nickel alloy such as that known as Inconel (Registered Trade Mark). The springs 10 are restrained between the castellations 25 on the upper and lower strips 7 and in use a fuel pin rests against each spring (see FIG. 1).

Reference is now made to FIG. 6, in association with FIG. 1, the same reference numerals being used for like parts. The wall members 1 have at one end an upper and lower tab 27 and 28 which are curved and welded to the adjacent wall member. The channel sections 2 extend upwardly to form tabs 29. The wall members 1 contain an upper array of slots 30, within which the strips 5, 6 and 7 can be inserted prior to welding. Slots 31 are arranged in a lower array corresponding to another arrangement of strips 5, 6 and 7. The lower array provides separation for the fuel pins in association with the upper array, since as can be seen from FIG. 5, an upper and a lower strip 7 are needed to support the springs 10. Also the fuel pins rest against upper and lower loops of strips 5.

The method of construction of the spacer grid is now described with reference to all the Figures. The strips 5 and 7 are assembled in a rectangular lattice by inserting the strips 7 into the slots 19, so that the raised portions 24 are in the slots. The strips 6 are then inserted parallel to the strips 7, but turned through a right angle so that they can be moved between the loops 14, 15 of the strips 5. When the strips 6 have been inserted so far that the pairs of slots 19, 20 are adjacent to loops 14, 15 or 15, 14 as the case may be, then the strips are turned through right angle so that the loops are engaged within the slots. The raised portions 17 finish in the slots 19, 20. The lattice of strips can then be tack welded together.

Once two lattices of strips have been assembled, they can be attached to wall members 1, which later can be welded one to another in the manner shown in the drawings. Attachment of the strips is via the slots 30, 31 which are adapted to receive the tabs 21. The walls at the end of the strips 5 are also slotted and these latter slots are arranged to receive the forked ends of the strips 5. In passing, it is to be noted that some of the strips 5 have forked end wherein the fork arms are of different lengths, so that they can properly interact with the curved profile of the wall members. The strips are welded into the wall members 1.

The function of the channel sections 2 is to form the tabs 29, whereby a shroud tube (not shown) is able to be slid over the grid, the tabs providing a lead onto the grid.

Reference is now made to FIG. 7, which shows a second embodiment of grid which is similar to the above described embodiment and wherein like reference numerals are used for like parts. The principal difference is that the wall members 1 have arms of substantially equal length. Consequently, less skill is required for their welding and a better weld is achieved. Also the wall members are easier to handle in fabrication because the lengthening of the shorter arm of the first embodiment makes it easier to hold.

From the above description it can be seen that an improved grid is formed which is of enhanced strength owing to the strip members 6, provides a physical barrier between fuel pins in the grid, has components which are not difficult to press despite being made of zircaloy and is easy to construct.

I claim:

1. A grid for a nuclear fuel assembly comprising sets of generally parallel strips arranged to intersect to define a structure of cellular form, at least some of the intersections including a strip which is secured to one other strip at more than one point at one intersection, the plural securement points of the intersection being spaced from each other along the length of one of the two strips.

2. A grid as claimed in claim 1, in which one type of strip is dimpled along its length.

3. A grid as claimed in claim 2, in which another type of strip has slots for keying with the dimples.

4. A grid as claimed in claim 2, in which said one type of strip is split in a direction generally parallel to its longitudinal axis at spaced points along its length such that oppositely directed dimples are provided at these points.

5. A grid as claimed in claim 4, in which dimples in said one type of strip extend towards dimples of adjacent strips in the structure, the dimples being at the same level.

6. A grid as claimed in claim 1, in which the structure is bounded by a peripheral band and the band includes channelled tabs having portions tapered downwardly and outwardly for guiding engagement of a fuel assembly shroud.

7. A grid as claimed in claim 6, in which the peripheral band comprises four similar parts arranged in a rectangle.

8. A grid as claimed in claim 7, in which the similar parts are generally 'L' shaped.

9. A grid as claimed in claim 8, in which the arms of the 'L' may be of equal length.

10. A grid for a nuclear fuel assembly, comprising a first set of generally parallel strips, a second set of generally parallel strips and a third set of generally parallel strips, the strips intersecting to define a structure of cellular form, the strips comprised in the first set being longitudinally split at spaced points along their lengths, counter opposed, laterally spaced dimples being provided at said points along the lengths, strips comprised in said second set intersecting and being secured to strips comprised in said first set at points where said strips in said first set are split, thereby providing securement between the strips at two points spaced lengthwise along strips of said second set at single intersections of strips of said first and second sets, strips of said first set intersecting strips comprised in said third set at only one point at an intersection between two such strips.

11. A grid for a nuclear fuel assembly, comprising a plurality of intersecting strips defining a structure of cellular form, at least some of said strips at some of said intersections having first and second strip portions that are spaced from each other laterally relative to the longitudinal axis of the strip of which they form a part and longitudinally along the length of the other strip which forms the respective intersection, the other strip at each said intersection being secured to said laterally spaced first and second strip portions such that said other strip is secured to the one strip at points spaced along the length of said other strip.

12. A grid as claimed in claim 11 wherein at least one of said first and second strip portions of a strip comprises a part of the width of the strip deformed bodily laterally out of the plane of the strip.

13. A grid as claimed in claim 12 wherein both of said first and second strip portions of a strip comprise parts of the width of the strip deformed laterally out of the plane of the strip, and separated from each other by a cut along part of the length of the strip.

14. A grid as claimed in claim 13 wherein said other strip at each said intersection has transverse slots extending inwardly from opposite edges partially across the width of the strip, slots from one edge being longitudinally spaced relative to slots from the opposite edge such that a slot from one edge receives a said first strip portion and a slot from the opposite edge receives a said second strip portion.

15. A grid as claimed in claim 14 wherein said first and second strip portions are sufficiently separated from each other across the width of their strip as to permit passage therebetween of said other strip when oriented such that the width and length of the other strip is normal to the width of the one strip, such that said other strip can be passed between said first and second strip portions and rotated to have said slots receive said first and second strip portions.

* * * * *